United States Patent
Balik et al.

(10) Patent No.: US 11,093,510 B2
(45) Date of Patent: Aug. 17, 2021

(54) RELEVANCE RANKING OF PRODUCTIVITY FEATURES FOR DETERMINED CONTEXT

(71) Applicant: Microsoft Technology Licensing, LLC, Redmond, WA (US)

(72) Inventors: Patricia Hendricks Balik, Seattle, WA (US); Anav Silverman, Sammamish, WA (US); Alyssa Rachel Mayo, Seattle, WA (US); Shikha Devesh Desai, Bellevue, WA (US); Gwenyth Alanna Vabalis Hardiman, Seattle, WA (US); Penelope Ann Collisson, Edmonds, WA (US); Yu Been Lee, Bellevue, WA (US); Susan Michele Hendrich, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 333 days.

(21) Appl. No.: 16/169,648

(22) Filed: Oct. 24, 2018

(65) Prior Publication Data

US 2020/0097586 A1 Mar. 26, 2020

Related U.S. Application Data

(60) Provisional application No. 62/734,659, filed on Sep. 21, 2018.

(51) Int. Cl.
G06F 16/2457 (2019.01)
G06F 16/93 (2019.01)
G06F 40/103 (2020.01)

(52) U.S. Cl.
CPC .. *G06F 16/24575* (2019.01); *G06F 16/24578* (2019.01); *G06F 16/93* (2019.01); *G06F 40/103* (2020.01)

(58) Field of Classification Search
CPC .................................................. G06F 16/24575
See application file for complete search history.

(56) References Cited

U.S. PATENT DOCUMENTS 7,788,247 B2    8/2010   Wang et al.
8,386,929 B2    2/2013   Zaika et al.
(Continued)

FOREIGN PATENT DOCUMENTS

WO     2018111702 A1    6/2018

OTHER PUBLICATIONS

"Non Final Office Action Issued in U.S. Appl. No. 16/169,731", dated Nov. 13, 2020, 18 Pages.
(Continued)

*Primary Examiner* — Charles E Lu

(57) ABSTRACT

The present disclosure relates to processing operations configured to identify and present productivity features that are contextually relevant for user access to an electronic document. In doing so, signal data is evaluated to determine a context associated with user access to an electronic document and insights, from the determined context, are utilized to rank productivity features for relevance to a user workflow. As an example, an intelligent learning model is trained and implemented to identify what productivity features are most relevant to a current task of a user. Productivity features are identified and ranked for contextual relevance. A notification comprising one or more ranked productivity features is presented to a user. In one example, the notification is presented through a user interface of an application/service. For instance, a user interface pane is surfaced to present suggestions. However, in alternative examples, notification of ranked productivity features is presented through different modalities.

20 Claims, 6 Drawing Sheets

(56) References Cited

U.S. PATENT DOCUMENTS

| | | |
|---|---|---|
| 8,515,950 B2 | 8/2013 | Gao et al. |
| 8,620,842 B1 | 12/2013 | Cormack |
| 9,094,363 B1 | 7/2015 | Myerson et al. |
| 9,235,978 B1 | 1/2016 | Charlton |
| 9,372,858 B1 | 6/2016 | Messing et al. |
| 9,373,078 B1 | 6/2016 | Olsson et al. |
| 9,396,177 B1 | 7/2016 | Kursun |
| 9,449,042 B1 | 9/2016 | Evans et al. |
| 9,584,565 B1 | 2/2017 | Ho et al. |
| 9,769,104 B2 | 9/2017 | Appelman et al. |
| 9,881,010 B1* | 1/2018 | Gubin .............. G06F 16/93 |
| 9,959,296 B1 | 5/2018 | Gubin et al. |
| 10,002,199 B2 | 6/2018 | Soto Matamala et al. |
| 10,120,746 B1 | 11/2018 | Sharifi Mehr |
| 10,133,791 B1 | 11/2018 | Chan |
| 10,135,781 B1 | 11/2018 | Yeskel et al. |
| 10,225,291 B2 | 3/2019 | Wilde et al. |
| 10,567,535 B2 | 2/2020 | Brown et al. |
| 2002/0054117 A1 | 5/2002 | van dantzich et al. |
| 2002/0087649 A1 | 7/2002 | Horvitz |
| 2003/0014491 A1 | 1/2003 | Horvitz et al. |
| 2003/0046421 A1 | 3/2003 | Horvitz et al. |
| 2003/0131069 A1 | 7/2003 | Lucovsky et al. |
| 2003/0135558 A1 | 7/2003 | Bellotti et al. |
| 2003/0139932 A1 | 7/2003 | Shao et al. |
| 2004/0002932 A1 | 1/2004 | Horvitz et al. |
| 2004/0003042 A1 | 1/2004 | Horvitz et al. |
| 2004/0098462 A1 | 5/2004 | Horvitz et al. |
| 2004/0128359 A1 | 7/2004 | Horvitz et al. |
| 2004/0216039 A1 | 10/2004 | Lane et al. |
| 2007/0214228 A1 | 9/2007 | Horvitz et al. |
| 2008/0195945 A1 | 8/2008 | Vaughan et al. |
| 2008/0294678 A1 | 11/2008 | Gorman et al. |
| 2009/0119324 A1 | 5/2009 | Simard et al. |
| 2009/0157595 A1 | 6/2009 | Gubitz |
| 2010/0070851 A1 | 3/2010 | Chen et al. |
| 2010/0217717 A1 | 8/2010 | Overby |
| 2011/0246937 A1 | 10/2011 | Roberts et al. |
| 2012/0072845 A1 | 3/2012 | John et al. |
| 2012/0233534 A1 | 9/2012 | Vanderwende et al. |
| 2012/0233544 A1 | 9/2012 | Roy |
| 2012/0239646 A1 | 9/2012 | Bailey et al. |
| 2012/0265528 A1* | 10/2012 | Gruber .............. G10L 15/183 704/235 |
| 2012/0303629 A1 | 11/2012 | Klein et al. |
| 2012/0304247 A1 | 11/2012 | Badger et al. |
| 2013/0110943 A1 | 5/2013 | Menon et al. |
| 2013/0290347 A1 | 10/2013 | Saib |
| 2013/0316744 A1 | 11/2013 | Newham et al. |
| 2013/0346408 A1 | 12/2013 | Duarte et al. |
| 2014/0000438 A1 | 1/2014 | Feis et al. |
| 2014/0040238 A1 | 2/2014 | Scott et al. |
| 2014/0052680 A1 | 2/2014 | Nitz et al. |
| 2014/0059144 A1 | 2/2014 | Lehmann et al. |
| 2014/0129661 A1 | 5/2014 | Thyagaraja |
| 2014/0253319 A1 | 9/2014 | Chang et al. |
| 2014/0278746 A1 | 9/2014 | Kolowich et al. |
| 2015/0185995 A1 | 7/2015 | Shoemaker et al. |
| 2015/0213024 A1 | 7/2015 | Frankel et al. |
| 2015/0229648 A1 | 8/2015 | Avery et al. |
| 2015/0358315 A1* | 12/2015 | Cronin .............. H04W 12/0608 726/6 |
| 2016/0018974 A1 | 1/2016 | Welton et al. |
| 2016/0078362 A1 | 3/2016 | Christodorescu et al. |
| 2016/0103835 A1 | 4/2016 | Zupancic |
| 2016/0248865 A1 | 8/2016 | Dotan-cohen et al. |
| 2016/0253304 A1 | 9/2016 | Evers et al. |
| 2016/0267283 A1 | 9/2016 | Takaai et al. |
| 2016/0335327 A1 | 11/2016 | Kanakadandi et al. |
| 2016/0350812 A1 | 12/2016 | Priness et al. |
| 2016/0360336 A1 | 12/2016 | Gross et al. |
| 2017/0048285 A1 | 2/2017 | Pearl et al. |
| 2017/0083929 A1 | 3/2017 | Bates et al. |
| 2017/0085678 A1 | 3/2017 | Babu et al. |
| 2017/0108995 A1 | 4/2017 | Ali et al. |
| 2017/0178048 A1 | 6/2017 | Ghotbi et al. |
| 2017/0220359 A1 | 8/2017 | Aguilar-gamez et al. |
| 2017/0220536 A1 | 8/2017 | Chiba et al. |
| 2017/0243465 A1 | 8/2017 | Schindlauer et al. |
| 2017/0249067 A1 | 8/2017 | Marzke et al. |
| 2017/0322678 A1 | 11/2017 | Silvis et al. |
| 2017/0329812 A1 | 11/2017 | Evers et al. |
| 2017/0344620 A1 | 11/2017 | Modarresi |
| 2018/0004544 A1 | 1/2018 | Vasiltschenko et al. |
| 2018/0004547 A1 | 1/2018 | Hayes et al. |
| 2018/0006989 A1 | 1/2018 | Dotan-cohen et al. |
| 2018/0025084 A1 | 1/2018 | Conlan et al. |
| 2018/0053207 A1 | 2/2018 | Modani et al. |
| 2018/0081503 A1 | 3/2018 | Green et al. |
| 2018/0123815 A1 | 5/2018 | Milvaney et al. |
| 2018/0129371 A1 | 5/2018 | Fowler et al. |
| 2018/0146070 A1 | 5/2018 | Lopushenko et al. |
| 2018/0188901 A1 | 7/2018 | Shtuchkin et al. |
| 2018/0189343 A1 | 7/2018 | Embiricos et al. |
| 2018/0189369 A1 | 7/2018 | Baek et al. |
| 2018/0196697 A1 | 7/2018 | Standefer et al. |
| 2018/0196784 A1 | 7/2018 | Kumar et al. |
| 2018/0253409 A1 | 9/2018 | Carlson et al. |
| 2018/0267950 A1* | 9/2018 | de Mello Brandao .................. G06F 3/0481 |
| 2018/0352091 A1 | 12/2018 | Puri et al. |
| 2018/0359199 A1 | 12/2018 | Nguyen et al. |
| 2018/0365325 A1 | 12/2018 | Gireesha et al. |
| 2019/0014205 A1 | 1/2019 | Miloseski et al. |
| 2019/0068526 A1* | 2/2019 | Xie .............. H04L 67/20 |
| 2019/0079909 A1 | 3/2019 | Purandare et al. |
| 2019/0138645 A1 | 5/2019 | Zhang et al. |
| 2019/0140995 A1 | 5/2019 | Roller et al. |
| 2019/0220438 A1 | 7/2019 | Pal et al. |
| 2019/0251197 A1 | 8/2019 | Li et al. |
| 2019/0258498 A1 | 8/2019 | Chandan et al. |
| 2019/0258949 A1 | 8/2019 | Reyes et al. |
| 2019/0266573 A1 | 8/2019 | Radhakrishnan et al. |
| 2019/0272553 A1 | 9/2019 | Saini et al. |
| 2019/0278844 A1 | 9/2019 | Brixey et al. |
| 2019/0334848 A1 | 10/2019 | Chen et al. |
| 2019/0334849 A1 | 10/2019 | Bostick et al. |
| 2019/0361720 A1 | 11/2019 | Balachandran |
| 2019/0377830 A1 | 12/2019 | Weldemariam et al. |
| 2019/0384622 A1 | 12/2019 | Chen et al. |
| 2020/0004808 A1 | 1/2020 | Yao et al. |
| 2020/0097340 A1 | 3/2020 | Balik et al. |

OTHER PUBLICATIONS

"Non Final Office Action Issued in U.S. Appl. No. 16/169,731", dated Feb. 20, 2020, 10 Pages.

Baralis, et al., "Learning From Summaries: Supporting e-Learning Activities by Means of Document Summarization", In Proceedings of IEEE Transactions on Emerging Topics in Computing, vol. 4, Issue 3, Jul. 1, 2016, pp. 416-428.

Liu, et al., "A Review of Structured Document Retrieval (SOR) Technology to Improve Information Access Performance in Engineering Document Management", In Journal of Computers in Industry, vol. 59, No. 1, Oct. 24, 2007, pp. 3-16.

"International Search Report and Written Opinion Issued in PCT Application No. PCT/US2019/039652", dated Oct. 17, 2019, 14 Pages.

Ranjan, Ritcha, et al., "Explore in Docs, Sheets and Slides makes work a breeze—and makes you look good, too", Retrieved from: https://docs.googleblog.com/2016/09/ExploreinDocsSheetsSlides.html, Sep. 29, 2016, 4 Pages.

Rao, Ramana, "Knowledge Management—From Unstructured Data to Actionable Intelligence", In IEEE IT Professional, vol. 5, Issue 6, Nov. 1, 2003, pp. 29-35.

Zorrilla, et al., "Data Webhouse to Support Web Intelligence in E-Learning Environments", In Proceedings of IEEE International Conference on Granular Computing, vol. 2, Jul. 25, 2005, pp. 722-727.

"Final Office Action Issued in U.S. Appl. No. 16/169,731", dated Aug. 20, 2020, 21 Pages.

(56) References Cited

OTHER PUBLICATIONS

"International Search Report and Written Opinion Issued in PCT Application No. PCT/US19/39649", dated Oct. 2, 2019, 24 Pages.
"Final Office Action Issued in U.S. Appl. No. 16/169,731", dated May 13, 2021, 17 Pages.

* cited by examiner

100

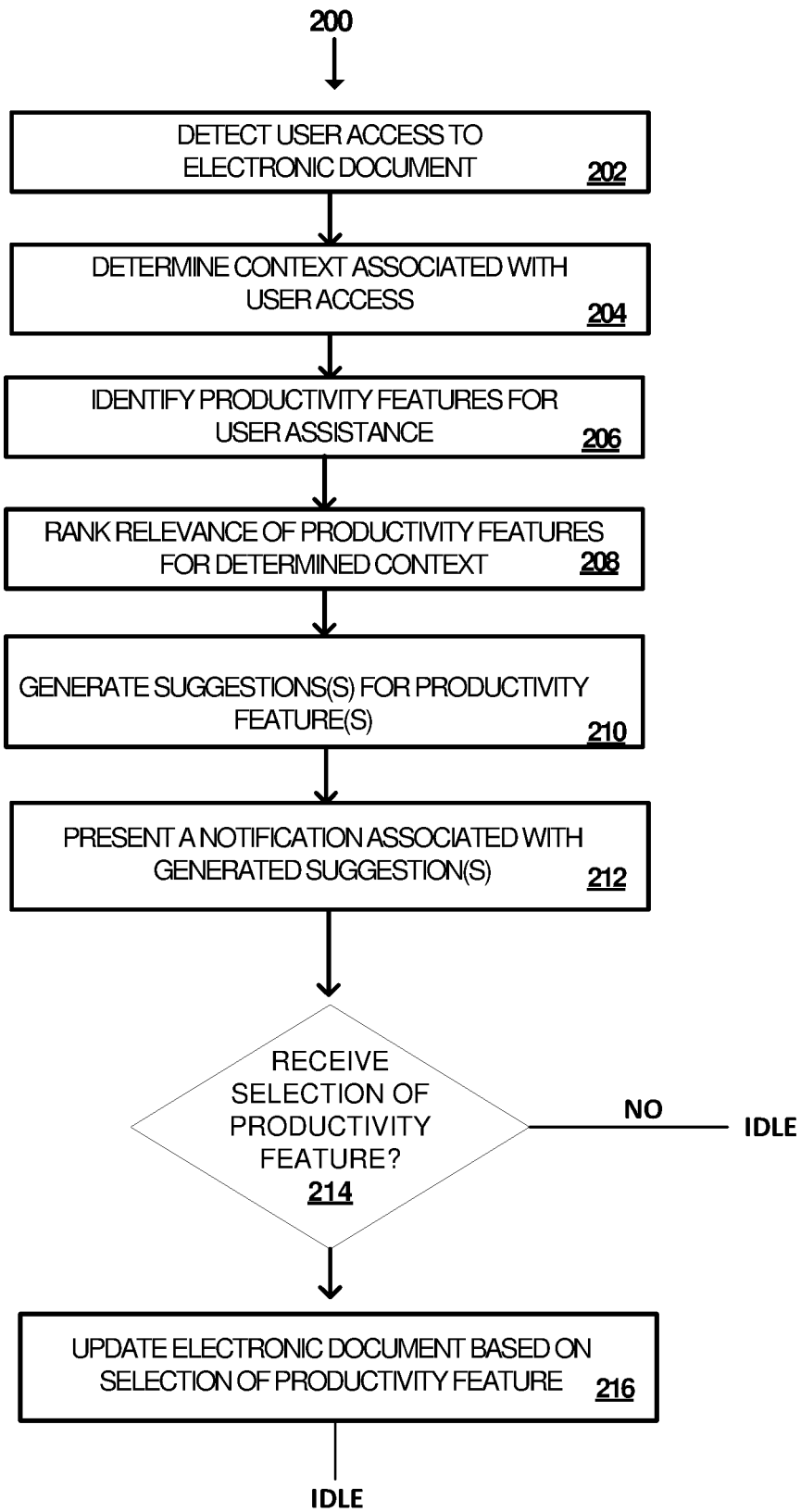

RELEVANCE RANKING OF PRODUCTIVITY FEATURES FOR DETERMINED CONTEXT

CROSS-REFERENCE TO RELATED APPLICATIONS

This application claims priority to U.S. Provisional Patent Application No. 62/734,659, entitled "RELEVANCE RANKING OF PRODUCTIVITY FEATURES FOR DETERMINED CONTEXT", filed on Sep. 21, 2018, which is incorporated by reference herein in its entirety.

BACKGROUND

Application platform suites such as Office365® provide access to a variety of different applications/services. Users may not be aware of all the features available to assist the user with execution of its tasks. Mainly, this is because traditional user interfaces are not configured to surface tools and features to assist a user based on an operational context. In examples where user interfaces are configured to provide notifications, the notifications may be untimely and interrupt the user from task completion. Again, such notifications may not reflect an operational context, which ultimately hinders user efficiency and creates a frustrating user interface experience.

In many cases, users are utilizing numerous applications/services for document creation and modification requiring a computing device to utilize a large amount of computing resources to manage execution of numerous applications/services as well as the corresponding processing operations. This is inefficient for an executing computing device as well as network resources that are used to access data for various applications/services. In addition to tying up computing resources, cross-application usage can prove tedious and inefficient, where users may continuously have to switch between applications/services to access and/or utilize application-specific content.

SUMMARY

In view of the foregoing technical challenges, the present disclosure relates to processing operations configured to identify and present productivity features that are contextually relevant for a task of a user (e.g., during user access to an electronic document). In doing so, signal data is evaluated to determine a context associated with user access to an electronic document and insights, from the determined context, are utilized to intelligently rank productivity features for relevance to a user workflow. As an example, an intelligent learning model is trained and implemented to identify what productivity features are most relevant to a current task of a user. Productivity features may be identified and ranked for contextual relevance. A notification comprising one or more ranked productivity features is presented to a user. In one non-limiting example, the notification is presented through a user interface of an application/service. For instance, a user interface may be adapted to surface a ranked listing of productivity features in order of relevance to a user's current task. However, in alternative examples, notification of ranked productivity features is presented through different modalities.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 2 illustrates an exemplary method related to identification and presentation of contextually relevant suggestions of productivity features on behalf of a user, with which aspects of the present disclosure may be practiced.

DETAILED DESCRIPTION

Figure 1:
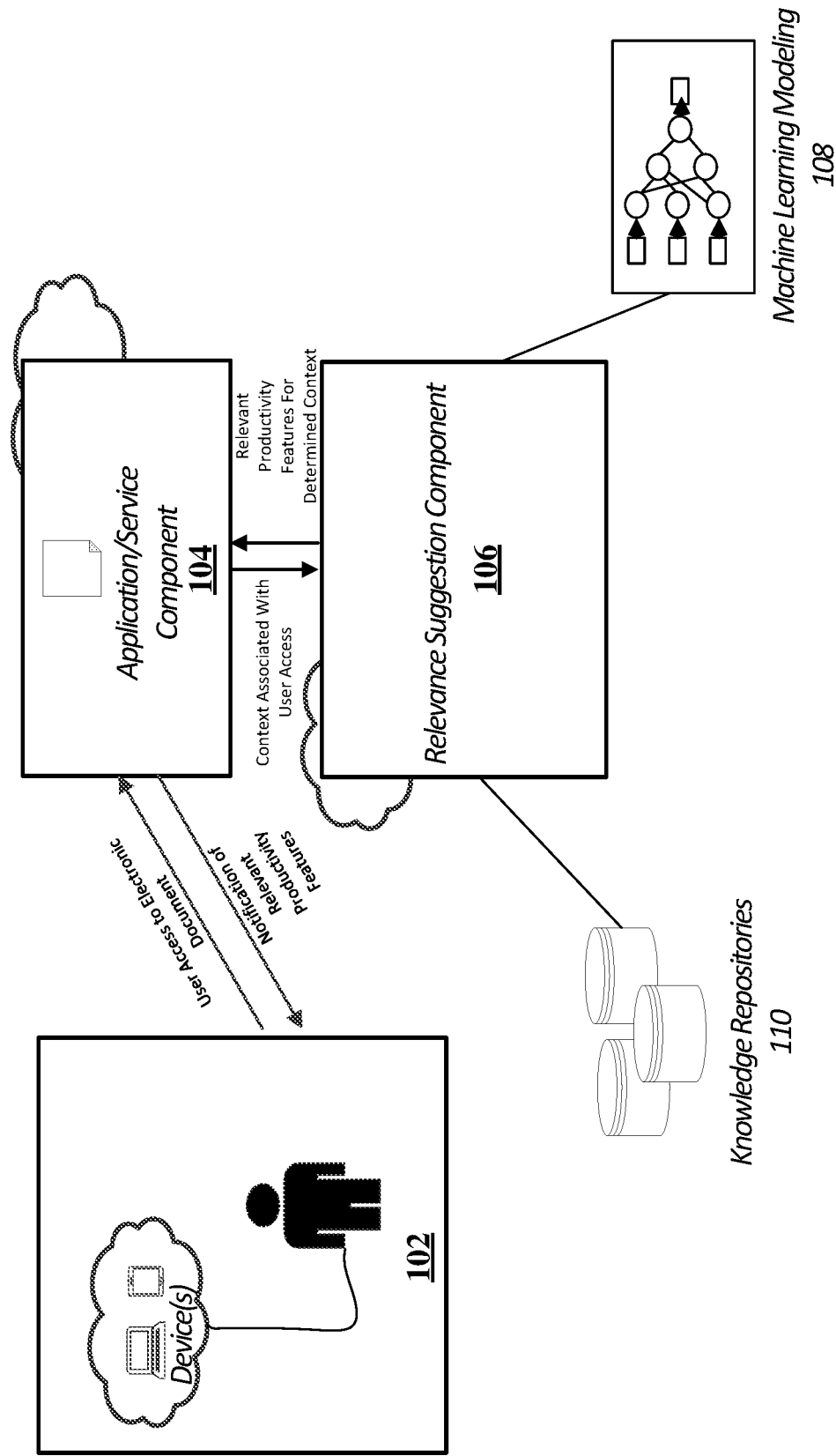
FIG. 1 illustrates an exemplary process flow providing exemplary components for contextual relevance processing as described herein, with which aspects of the present disclosure may be practiced.

The present disclosure relates to processing operations configured to identify and present productivity features that are contextually relevant for a task of a user (e.g., during user access to an electronic document). In doing so, signal data is evaluated to determine a context associated with user access to an electronic document and insights, from the determined context, are utilized to intelligently rank productivity features for relevance to a user's workflow. Notifications are tailored with contextually relevant context for a user, the notifications can be proactively provided, on behalf of a user, at a time when they would be most useful for a task of a user. Machine learning modeling is utilized to generate predictive relevance for productivity feature suggestions. Predictive relevance is determined for a context associated with user access to an electronic document based on analysis of signal data as described herein. Example notifications are proactively and timely provided so that the notifications may aid processing efficiency in task execution as well as an improve user interface experience. A manner in which the notification is presented may vary based on the confidence in the relevance of the suggestion and timing relevance for interrupting a user's workflow as to avoid unnecessary or untimely notifications that may affect a user's focus and task execution. Non-limiting examples of types of notifications comprise but are not limited to: badge icon notifications (e.g., application command control user interface features); user interface callouts of varying sizes and amounts of data; direct insertion of a suggestion into an electronic document that is being accessed; generation of customized listings of suggestions presented through a user interface pane of an application/service; and notifications surfaced through different modalities (e.g., email, messaging, chat, audio, video) other than a user interface by which an electronic document is being accessed, among other examples.

As an example, an intelligent learning model is trained and implemented to identify what productivity features are most relevant to a current task of a user. Machine learning modeling may be trained to generate a confidence score as to how relevant a specific productivity feature correlates with a determined context associated with user access to an electronic document. Confidence scores associated with specific productivity features may be utilized to rank/prioritize an order in which productivity feature suggestions are provided to a user. In doing so, the intelligent learning model may generate insights based on evaluation of signal data related to user access to an electronic document. Signal data may comprise any of: computing device-specific signal data; application/service-specific signal data; user-specific signal data and a combination thereof. Specific non-limiting examples of such types of signal data comprise but are not limited to: signal data used for classifying a user and/or type of user access; signal data related to user application/service usage and user actions; signal data related to content of an electronic document (including formatting/layout of content); signal data related to a lifecycle of an electronic document; signal data related to collaborative usage; and signal data collected from other users of a specific application/service or an application platform suite, among other examples.

Primarily, a trained intelligent learning model is configured to identify and rank productivity features for contextual relevance. Productivity features comprise features and tools for task execution that are accessible by a specific application/service or an application platform suite (e.g., Microsoft® Office®; Office365®). An application platform suite is configured to providing access to a plurality of applications/services, thereby enabling cross-application/service usage to enhance functionality of a specific application/service at run-time. As productivity features may span a wide variety of functionality, contextual relevance evaluation is configured to identify specific productivity features that are most relevant to a context in which a user is accessing an electronic document. That is, contextual relevance of productivity feature suggestions may vary as a context associated with user access changes. For instance, users may access different application/services to work with specific types of electronic documents, the type of user access (e.g., viewer versus author) may vary, user access patterns may vary for a given context (e.g., a user may have a history of working with specific types of documents but not others), etc. Therefore, examples of the present disclosure extend to those where processing operations are programmed to be implemented for a specific application/service as well as those where processing components are associated with a microservice that is extensible to a plurality of different applications/services.

An example microservice provides a lightweight service-oriented architecture that enables contextual relevance suggestions of productivity features to be developed, deployed and scaled across different types of applications/services. An exemplary microservice is exposed to other applications/services, thereby enabling efficient future scaling where code of specific applications/services does not need to be altered to implement an updated software solution. For instance, a microservice may provide processing to determine contextually relevant suggestions of productivity features based on a specific application/service that a user is working with, so as not to slow down processing efficiency of the application/service. The microservice may be trained to interface with a plurality of different applications/services (e.g., application platform suite), to provide tailored experiences across specific applications/services based on the productivity features that are available in respective applications/services. Implementation of a microservice is known to one skilled in the field of art, where operation of an example microservice may be adapted to provide functionality as described in the present disclosure.

Results from contextual relevance ranking may be utilized to generate a notification of productivity features on behalf of a user. For instance, a notification may be generated for a user, where the notification comprises identification of one or more ranked productivity features that are most contextually relevant to the user at given point in time. User access may correspond to different points in a lifecycle of the electronic document where different productivity features may be more relevant at the beginning of document creation as opposed to the end of the document creation. For example, say the user is just initiating creation a slide-based presentation and is adding content. A productivity feature for design and layout of the content may be useful to help the user, who is authoring the slide-based presentation, generate a best representation of the content. For comparison sake, say the user has created a slide-based presentation with a plurality of slides and is at the point of reviewing the slide-based presentation for actual presentation. In such a case, the user may not be a viewer of presentation document rather than an active editor. Productivity features for sentence structure tips (e.g., active voice versus passive voice) or setting reminders (e.g., meeting, time of presentation), among other examples, may be more useful to the user.

In one non-limiting example, a notification is presented through a user interface of an application/service. For instance, a user interface may be adapted to surface a ranked listing of productivity features in order of relevance to a user's current task. In one such example, a user interface of an application/service may be adapted to surface a specific user interface pane for presentation of productivity feature suggestions. This may occur proactively, on behalf of a user, during access to an electronic document. However, in alternative examples, notification of ranked productivity features may also be presented through different modalities (e.g., email, messaging, chat, audio, video) other than a user interface of an application/service that is being utilized to access an electronic document. For instance, proactive notification may be provided through a different modality (e.g., different application/service and/or computing device) while a user is actively accessing an electronic document.

Real-time (or near real-time) processing enables application/services to continuously provide tailored user experiences, where user interfaces may be adapted to reflect a context that a specific user is working with. Processing device views that illustrate non-limiting user interface examples of the present disclosure are provided in FIGS. 3A-3C. Such processing device views provide visual examples of how a user interface is adapted and improved over traditional user interfaces that are not configured to intelligently rank and present productivity feature suggestions.

Exemplary technical advantages provided by processing described in the present disclosure comprise but are not limited to: enhancement of processing efficiency during digital document creation and editing in real-time (or near real-time); improved processing efficiency (e.g., reduction in processing cycles, saving resources/bandwidth) for computing devices at the time of user access to an electronic document; adapting and improving front-end user interfaces that are utilized for access to and creation/modification of electronic documents; generation and curation of contextually relevant suggestions of productivity features for different across different contexts; proactive notification of contextually relevant suggestions of productivity features on behalf of a user; extensibility to tailor processing operations described herein across a plurality of different applications/services including implementing a micro-service configured for improving efficiency and operation of applications/services and associated computing devices; reduction in latency in implementing contextually relevant productivity features to assist with electronic document creation/modification; and improving usability of applications/services, among other technical advantages.

FIG. 1 illustrates an exemplary process flow 100 providing exemplary components for contextual relevance processing as described herein, with which aspects of the present disclosure may be practiced. As an example, components of process flow 100 may be executed by an exemplary computing system (or computing systems) as described in the description of FIG. 4. Exemplary components, described in process flow 100, may be hardware and/or software components, which are programmed to execute processing operations described herein. In one example, components of process flow 100 may each be one or more computing devices associated with execution of a specific service. Exemplary services may be managed by an application platform that also provides, to a component, access to and knowledge of other components that are associated with applications/services. In one instance, processing operations described in process flow 100 may be implemented by one or more components connected over a distributed network. Operations performed in process flow 100 may correspond to operations executed by a system and/or service that execute computer programs, application programming interfaces (APIs), neural networks or machine-learning processing, language understanding processing, search and filtering processing, and generation of content for presentation through a user interface of an application/service, among other examples. In the illustration of process flow 100, there are process flow steps that are aimed at emphasizing non-limiting examples of interaction between components shown in FIG. 1. Process flow between components may be altered without departing from the spirit of the present disclosure.

Process flow 100 comprises user computing device(s) 102 (e.g., client computing device). An example of a user computing device 102 is a computing system (or computing systems) as described in the description of FIG. 4. A user may interact with an exemplary application/service through the user computing device(s) 102. For instance, the user may connect to an application/service through any number of different device modalities. In some examples, a user may connect to an application/service (e.g., a productivity application/service that is utilized to create or modify an electronic document) through different user computing devices 102, where non-limiting examples of such are: a smart phone, a laptop, a tablet, a desktop computer, etc. In other instances, a user may carry on a multi-modal communication with an application/service via multiple user computing devices.

A user may be accessing, through interfacing between a computing device 102 and an application/service component 104, one or more application/services that are used to execute any type of task including document creation and/or modification. An application/service that the user is accessing is configured to provide a user interface or graphical user interface (GUI) that enables access to and creation/modification of electronic documents. An example user interface may be adapted to provide functionality described herein where user interface features and application command control is achieved to foster improved creation of electronic documents through new user interface features that are not present in traditional user interface systems. For instance, signal data related to user interaction with an application/service, past interactions with applications/services by the user and/or other users, may be utilized to tailor notifications and suggestions provided through a user interface. New user interface menus may be presented to a user that include suggestions of contextually relevant productivity features at a determined reference point in a lifecycle of the electronic document. Processing device views that illustrate non-limiting user interface examples of the present disclosure are provided in FIGS. 3A-3C.

An electronic document (or electronic file) is a representation of content in an electronic media/electronic format such as a digital file. Examples of electronic documents may vary where files may be created to work with any type of application/service and in any type of file format as known to one skilled in the field of art. For instance, an electronic document may be created for a word processing service, notetaking service, slide-based presentation service, etc., where the electronic document may comprise authored content. Electronic documents may be accessed natively, through applications stored on the user computing device. In alternate examples, electronic documents may be accessed over a network connection such as in the following non-limiting examples: an electronic document is a web page accessed through a web browser; and an electronic document a distributed copy of a file that is being accessed but is remotely stored on a data storage (e.g., distributed data storage) other than the computing device 102 that is being used to access content.

As referenced above, exemplary applications/services may interface with other components of process flow 100 to enhance processing efficiency and functionality as described herein. The application/service component 104 is configured to interface with other components of process flow 100 including computing device(s) 102 and the relevance suggestion component 106. Applications/services may be any type of programmed software. An exemplary application/service is a productivity application/service that is configured for execution to enable users to complete tasks on a computing device, where exemplary productivity services may be configured for access to and creation of content including electronic documents. Examples of productivity services comprise but are not limited to: word processing applications/services, spreadsheet applications/services, notes/notetaking applications/services, authoring applications/services, digital presentation applications/services, search engine applications/services, email applications/services, messaging applications/services, web browsing applications/services, collaborative team applications/services, digital assistant applications/services, webpage building applications/service, directory applications/services, mapping services, calendaring services, electronic payment services, digital data storage or distributed data storage applications/services, web conferencing applications/services, call communication applications/services, language understanding applications/services, bot framework applications/services, networking applications/service, and social networking applications/services, among other examples. In some examples, an exemplary productivity application/service may be a component of an application platform providing a suite of productivity applications/services. An application platform suite is configured to providing access to a plurality of applications/services, thereby enabling cross-application/service usage to enhance functionality of a specific application/service at run-time. As productivity features may span a wide variety of functionality, contextual relevance evaluation is configured to identify specific productivity features that are most relevant to a context in which a user is accessing an electronic document. Moreover, specific application/services as well as application platform suites may be configured to interface with other non-proprietary application/services (e.g., third-party applications/services) to extend functionality including productivity feature suggestion and implementation.

As referenced in the foregoing, the application/service component 104 is configured to interface with the relevance suggestion component 106. In doing so, signal data may be collected by either: the application/service component 104; or the relevance suggestion component 106 via the application/service component 104, to enable contextual processing for user access to an electronic document. Signal data may then be evaluated, where evaluation of the signal data yields generation of insights that are used for identifying most relevant productivity features for a given context. Signal data may comprise any of: computing device-specific signal data; application/service-specific signal data; user-specific signal data and a combination thereof. Specific non-limiting examples of such types of signal data comprise but are not limited to: signal data used for classifying a user and/or type of user access; signal data related to user application/service usage and user actions; signal data related to content of an electronic document (including formatting/layout of content); signal data related to a lifecycle of an electronic document; signal data related to collaborative usage; and signal data collected from other users of a specific application/service or an application platform suite, among other examples.

In one example, the relevance suggestion component 106 is configured to evaluate signal data usable to classify a type of user access to an electronic document. Classification of a type of user access may be useful in curating productivity features to identify what productivity features are most relevant to the user at the current time that the user is accessing an electronic document. For instance, signal data may be collected and correlated to determine whether a user is a viewer or an author of the electronic document. In examples where the user is an author, who may be actively creating/editing an electronic document, productivity features related to content modification may be more useful to the user than productivity that offer more passive assistance (e.g., whether the electronic document should be shared with other users). As an example, determination as to whether a user is a viewer or author of an electronic document may be further based on signal data that indicates user activity with respect to an electronic document, among other types of signal data. Examples of types of signal data that may indicate user action with respect to an electronic document that may be collected comprise but are not limited to: determining whether the user is actively editing an electronic document (including evaluation of specific types of actions); determining a type of mode (e.g., read-only, editable) that the electronic document is in; identifying tasks/reminders associated with the user; and detecting idle time between received user actions, among other examples. Furthermore, signal data such as the type of computing device that is being utilized to access an electronic document may be analyzed to determine context associated with user access. In some cases, certain productivity features may be more relevant for one modality (e.g., mobile phone or tablet) as compared with another type of modality (e.g., desktop computer, smart watch).

Moreover, the relevance suggestion component 106 is configured to evaluate signal data usable to determine a reference point in a lifecycle of the electronic document. User access may correspond to different points in a lifecycle of the electronic document where different productivity features may be more relevant at the beginning of document creation as opposed to the end of the document creation. For example, say the user is just initiating creation a slide-based presentation and is adding content. A productivity feature for design and layout of the content may be useful to help the user, who is authoring the slide-based presentation, generate a best representation of the content. For comparison sake, say the user has created a slide-based presentation with a plurality of slides and is at the point of reviewing the slide-based presentation for actual presentation. In such a case, the user may not be a viewer of presentation document rather than an active editor. Productivity features for sentence structure tips (e.g., active voice versus passive voice) or setting reminders (e.g., meeting, time of presentation), among other examples, may be more useful to the user. A reference point, as described herein, may be determined based on collection of a number of different types of signal data including but not limited to: analysis of timestamps data for a creation date of an electronic document relative to current timestamp data; signal data indicating an amount of access to the electronic document by a user (or group of users); signal data indicating comments and/or tasks/reminders that are outstanding; evaluation of metadata associated with electronic document indicating finality of electronic document (e.g., file name, indication of keywords such as "draft", "final", etc.); determining a type of mode (e.g., read-only, editable) that the electronic document is in; and evaluating user usage data/user behaviors (e.g., of the specific user and/or other users) related to similar document types, among other examples.

Furthermore, the relevance suggestion component 106 is configured to evaluate signal data usable to determine a level of user engagement with one or more productivity features based on past actions or past behaviors taken by the user and/or other users. As an example, the relevance suggestion component 106 may be configured to interface with knowledge repositories 110 that provide access to log data and/or telemetric data indicating user engagement in specific contextual scenarios. Such data may be mined and applied to identify what productivity features may be most relevant to the user. For instance, a user may prefer to use certain types of productivity features and ignore other types of productivity features. In further examples, signal data for user engagement may further identify whether notifications for specific productivity features have been presented to the user and how frequently such notifications have been presented. User behaviors indicating interactions with such notifications may further be useful in identification of relevant productivity features. In any example, user signal data is collected and analyzed in accordance with privacy laws and regulations and may also require user content to have such data collected and analyzed (potentially including opt-in and/or opt-out clauses in consent).

In evaluating context of user access, the relevance suggestion component 106 is further configured to evaluate signal data usable to identify content associated with the electronic document and formatting associated with the content. For example, content and metadata associated with an electronic document may be parsed and evaluated, which may enable insights to be generated such as: how formatting/layout of content can be arranged/re-arranged; where content may be modified (e.g., added; removed); whether a form of the content may be improved/modified (e.g., rich data object added instead of a static data object); version identification of an electronic document; and whether a user has accessed and/or edited an electronic document, among other examples.

Other types of signal data evaluated to understand a context associated with user access may comprise signal data usable to identify one or more of tasks and reminders that are associated with the electronic document. Identification of tasks and reminders may be useful in identifying relevant productivity features that may help resolve outstanding tasks and/or dovetail with reminders for task execution.

In some examples, signal data related to a classification of the user may be utilized to aid contextual determination related to user access. For instance, profile data associated with a user account may be utilized to indicate: user preferences; badges and/or achievements; job titles/rank in an organization, group, team, etc.; and social network connections, among other examples. Such signal data may further be useful to classify user preferences relative to other users of an application/service and/or application platform suite. In further examples, collaborative access to an electronic document by the user and/or other user accounts may be further utilized to predict user preferences for receiving insights related to specific productivity features.

Machine learning modeling 108 is applied by the relevance suggestion component 106 for processing operation steps comprising: evaluation of signal data associated with an instance of user access to an electronic document; generating of insights from the evaluation of the signal data; identification of productivity features; relevance ranking of the identified productivity features; selection of a type of proactive notification for identification of productivity feature suggestions; and generating of proactive notifications identifying productivity feature suggestions. Creation, training and update of a machine learning modeling 108 is known to one skilled in the field of art. In examples of the present disclosure, known examples of machine learning modeling are adapted to generate and expose an intelligent learning model for execution of the processing operations described herein. In doing so, the intelligent learning model is created, trained and implemented, to correlate productivity features with insights generated based on evaluation of collected signal data. For example, one or more layers of abstraction may be applied during the machine learning modeling 108, where the one or more layers of abstraction correlate specific signal data with productivity features.

To gain access to data needed for execution of the machine learning modeling 108, the relevance suggestion component 106 interfaces with a plurality of knowledge repositories 110. Knowledge repositories 110 may comprise knowledge data that is used to execute any processing operations for the relevance suggestion component 106. Knowledge repositories 110 may be accessed to obtain data for generation, training and implementation of machine learning modeling 108. Knowledge resources comprise any data affiliated with an application platform (e.g., Microsoft®, Google®, Apple®, IBM®) as well as data that is obtained through interfacing with resources over a network connection including third-party applications/services.

A ranker may be trained and employed by the machine learning modeling 108. The ranker is configured to score the correlation between the context associated with the user access and the functionality of specific productivity features. Ranking processing, ranking methodologies (including classification and regression analysis) and implementation of an exemplary ranker is known to one skilled in the field of art. The machine learning modeling 108 may be trained to generate a confidence score as to how relevant a specific productivity feature correlates with a determined context. Confidence scores associated with specific productivity features may be utilized to rank/prioritize an order in which productivity feature suggestions are provided to a user. In further examples, developers may implement weighting to emphasize priority of specific insights over other insights, where developers can assign different weights to different insights to tailor ranking processing. Rankings associated with productivity features enables the machine learning modeling 108 to select specific productivity features for presentation at specific times. For example, one or more highest ranked of productivity features may be selected for presentation to a user based on the determined context associated with the user access. In some alternative example, the same ranker or an additional ranker may be trained to generate a predictive confidence interval related to a time interval in which the user should be notified of a productivity features suggestion. This may further be useful to a determination of which productivity features to present to a user as well as when to present such features.

The relevance suggestion component 106 may be further configured to manage generation of proactive notifications of productivity features suggestions. For example, machine learning modeling 108 executes processing operations to predictively determine relevance of a suggestion that relates to: 1) a confidence in the quality of the suggestion; and 2) a timing prediction as to the urgency for surfacing the suggestion to the user so that the suggestion is most applicable. The relevance suggestion component 106 may selectively generate notifications based on the context of the user access, where a level of confidence of relevance and a determination as to a level of urgency for interrupting a user impact the type of notification that is to be proactively presented. Non-limiting examples of types of notifications comprise but are not limited to: badge icon notifications (e.g., application command control user interface features); user interface callouts of varying sizes and amounts of data; direct insertion of a suggestion into an electronic document that is being accessed; generation of customized listings of suggestions that are presented through a user interface pane of an application/service; and notifications surfaced through different modalities (e.g., email, messaging, chat, audio, video) other than a user interface by which an electronic document is being accessed, among other examples.

Moreover, the relevance suggestion component 106 may be further configured to execute machine learning modeling 108 for the generation of productivity feature suggestions based on the ranking of the productivity features and the determined context associated with the user access for the electronic document. For instance, suggestions for task execution and improving user workflow, which are most relevant to the determined context, are generated on behalf of the user. This may comprise but is not limited to: suggestions for modification of electronic documents, task execution corresponding with the electronic document (e.g., sharing/collaboration, adding comments, reminders, setting meetings); educational and learning insights; automation of action(s) on behalf of a user; recommendations of new/undiscovered features; and telemetry analytics, among other examples. In other examples, processing for generation of contextually relevant productivity feature suggestions may be executed by the relevance suggestion component 106, the application/service component 104 or a combination thereof.

One or more of the suggested productivity features may be selected for output. Selected suggestions for productivity features may be propagated to the application/service component 104 for generation of a notification usable to present a suggested productivity feature to a user. The application/service component 104 is configured to generate a notification for user provision of one or more ranked productivity features. In one example, the application/service component 104 presents the notification through the user interface of an application/service in which the user is accessing the electronic document. For instance, a user interface may be adapted to surface a ranked listing of productivity features in order of relevance to a user's current task. In one such example, a user interface of an application/service may be adapted to surface a specific user interface pane that is tailored for the presentation of productivity feature suggestions. Non-limiting visual examples are provided in FIGS. 3B and 3C, respectively illustrating processing device views 320 and 340. In further examples, the machine learning modeling 108 may be trained to evaluate other types of factors in determining how to present productivity feature suggestions. Examples of such factors include but are not limited to: the modality by which the user is accessing an application/service; available display space within an application/service based on the usage by the user; and threshold levels of ranking (e.g., a number of ranked suggestions that meet a threshold level of relevance), among other examples.

In alternative examples, notification of ranked productivity features may also be presented through other applications/services. For example, contextual evaluation may determine that a notification is best suited to be provided to the user through a different modality (e.g., email, messaging, chat, audio, video) other than a user interface of an application/service that is being utilized to access an electronic document. In such an instance, the relevance suggestion component 106 may direct the application/service component 104 to utilize another application/service to present/surface the notification through a selected modality.

The application/service component 104 is configured to interface with the computing device(s) 102 to present the notification of the productivity feature suggestion(s). For example, a computing device 102, accessing an application/service executing thereon, may present the notification through its user interface. The user may interact with the notification. For example, the user may select, through the user interface, a user interface features that triggers update to the electronic document based on a suggestion associated with the productivity feature. In such an example, the electronic document may be updated based on the selection.

Processing operations of the relevance suggestion component 106 may be written into the coding of an application/service, where an application/service may be adapted to implement functionality described in the present disclosure. In another example, processing by the relevance suggestion component 106 may be may be executed by a stand-alone application/service that is configured to interface with the application/service component 104 to provide customized application experiences. For example, an application/service for management of productivity feature suggestions may interface with an application platform providing an application platform suite of productivity applications/services, where productivity feature suggestions can be tailored to the specific context of a user workflow. In one non-limiting implementation example of a stand-alone application/service for personalized content management, the relevance suggestion component 106 may be configured as a component of a microservice that can be reused by different applications/services and adapted to application-specific scenarios. In such an example, an example micro-service may interface with other applications/services through an application programming interface (API). As described in the foregoing description, the microservice provides a lightweight service-oriented architecture that enables content suggestion management to be developed, deployed and scaled across different types of applications/services. Implementation of a microservice is known to one skilled in the field of art, where operation of an example microservice may be adapted to provide functionality as described in the present disclosure.

FIG. 2 illustrates an exemplary method 200 related to identification and presentation of contextually relevant suggestions of productivity features on behalf of a user, with which aspects of the present disclosure may be practiced. Processing operations described in method 200 may be executed by components described in process flow 100 (FIG. 1), where the detailed description in process flow 100 supports and supplements the recited processing operations in method 200. Interfacing and communication between exemplary components, such as those described in process flow 100, are known to one skilled in the field of art. For example, data requests and responses may be transmitted between applications/services to enable specific applications/services to process data retrieved from other applications/services. Formatting for such communication may vary according to programmed protocols implemented by developers without departing from the spirit of this disclosure.

Figure 4:
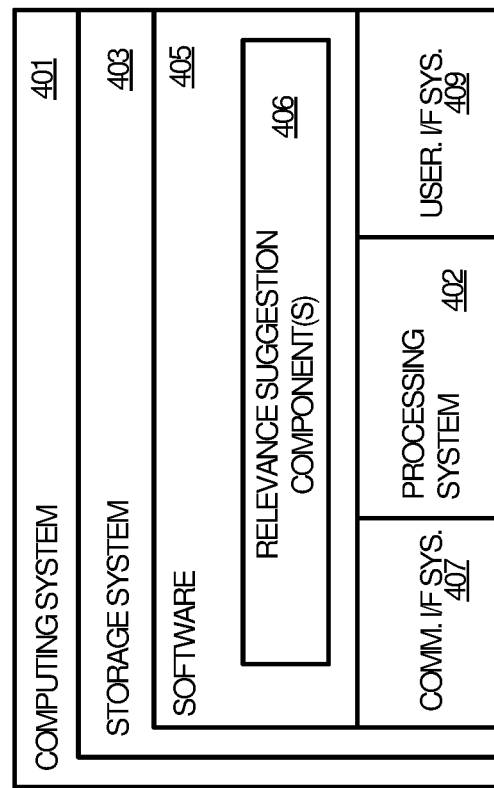
FIG. 4 illustrates a computing system suitable for implementing processing operations described herein related to contextual relevance processing, with which aspects of the present disclosure may be practiced.

As an example, method 200 may be executed across an exemplary computing system (or computing systems) as described in the description of FIG. 4. Exemplary components, described in method 200, may be hardware and/or software components, which are programmed to execute processing operations described herein. Operations performed in method 200 may correspond to operations executed by a system and/or service that execute computer programs, software agents, intelligent bots, application programming interfaces (APIs), neural networks and/or machine-learning processing, among other examples. In some examples, processing operations described in method 200 may be executed by one or more applications/services associated with a web service that has access to a plurality of application/services, devices, knowledge resources, etc. In one instance, processing operations described in method 200 may be implemented by one or more components connected over a distributed network.

Method 200 begins at processing operation 202, where user access to an electronic document is detected. As an example, user access to an electronic document may be detected based on interaction between a user computing device and an application/service that is utilized to work with the electronic document. Examples of electronic documents and user access to electronic documents has been described in the foregoing description including the description of process flow 100 (FIG. 1).

Flow of method 200 may proceed to processing operation 204, where a context associated with the use access to the electronic document is determined. As an example, processing operation 204 comprises collecting and evaluating signal data associated with the user access. Evaluation of signal data for determination of context has been described in the foregoing description including the description of process flow 100 (FIG. 1), for example, where a relevance suggestion component 106 executes processing for contextual determination of user access through machine learning modeling. As an example, processing operation 204 comprises evaluation of signal data for classifying a type of user access to the electronic document and determining a reference point in a lifecycle of the electronic document. Other non-limiting examples of signal data evaluation, for determination of a context associated with the user access, comprises but is no limited to: identifying content associated with the electronic document and formatting associated with the content; determining a level of user engagement with one or more productivity features based on past actions taken by the user and/or other users; identifying one or more of tasks and reminders that are associated with the electronic document; and evaluating collaborative access to the electronic document by the user and other users of an application/service (or platform application), among other examples.

At processing operation 206, productivity features for user assistance are identified. Productivity features have been described in the foregoing description. Identification of productivity features has been described in the foregoing description including the description of process flow 100 (FIG. 1), for example, where a relevance suggestion component 106 executes identification of productivity features through machine learning modeling (e.g., implementation of an intelligent learning model). As an example, identified productivity features are associated with a productivity application or service that presents the electronic document. However, examples are not so limited and productivity features may be associated with any application/service that is programmed to interface with the application/service (or application platform) which is used to access the electronic document.

Flow of method 200 may proceed to processing operation 208, where productivity features are ranked for relevance based on the determined context. Relevance ranking of productivity features for user assistance has been described in the foregoing description including the description of process flow 100 (FIG. 1), for example, where a relevance suggestion component 106 executes machine learning modeling to rank productivity features for user assistance based on generated insights, confidence determinations, etc. For instance, machine learning modeling, of a tailored machine learning model, may be trained to generate a confidence score as to how relevant a specific productivity feature correlates with a determined context. Confidence scores associated with specific productivity features may be utilized to rank/prioritize an order in which productivity feature suggestions are provided to a user.

At processing operation 210, suggestions are generated for user assistance. Processing operation 210 comprises generating relevant productivity feature suggestions based on the ranking of the productivity features and the determined context associated with the user access for the electronic document. For instance, suggestions for task execution and improving user workflow, which are most relevant to the determined context, are generated on behalf of the user. This may comprise but is not limited to: suggestions for modification of electronic documents, task execution corresponding with the electronic document (e.g., sharing/collaboration, adding comments, reminders, setting meetings); educational and learning insights; automation of action(s) on behalf of a user; recommendations of new/undiscovered features; and telemetry analytics, among other examples. Processing operation 210 may be executed by the relevance suggestion component 106 (FIG. 1), the application/service component 104 (FIG. 1) or a combination thereof.

Processing operation 210 may further comprise generation of a notification for a relevant productivity feature suggestion as discussed in process flow 100. In some examples, a notification may pertain to a suggestion of a relevant productivity feature individually or in a grouping (e.g., through a user interface pane or callout) presented through a user interface. For instance, a user interface may be adapted to surface a ranked listing of productivity features in order of relevance to a user's current task. In one such example, a user interface of an application/service may be adapted to surface a specific user interface pane for presentation of productivity feature suggestions. However, in alternative examples, notification of ranked productivity features may also be presented through different modalities (e.g., email, messaging, chat, audio, video) other than a user interface of an application/service that is being utilized to access an electronic document.

Flow of method 200 may proceed to processing operation 212, where a notification associated with a generated suggestion is presented. For instance, the notification is presented (processing operation 212) through a user interface of an application/service that is being used for access to the electronic document. A notification may be presented to the user through any type of user interface feature, audio command, video command, or other input modality as known to one skilled in the field of art. In many examples, notifications may be proactively presented to a user as described in the foregoing description. That is, processing operation 212 may comprise automatically surfacing the notification without receiving a request for user assistance (e.g., request for productivity features to be presented) from a user associated with the user access. In an alternative example, a request for provision of productivity features is received through a user interface associated with a productivity application or service. In such an example, the request acts as a trigger for presentation (processing operation 212) of the notification. Other examples related to presentation of a generates suggestion have been provided in the foregoing description.

Processing may proceed to decision operation 214, where it is determined whether a selection of suggestion, that is associated with a productivity feature, is received. In examples where a user ignores a productivity feature suggestion and no selection is made, flow of decision operation 214 branches NO and processing of method 200 remains idle until subsequent contextual evaluation takes place. In examples where a selection of a productivity feature suggestion is made, flow of decision operation 214 branches YES and processing of method 200 proceeds to processing operation 216. At processing operation 216, an update to the electronic document occurs based on the selection of the productivity feature suggestion. In such an example, the electronic document may be updated based on the selection.

Figure 3A:
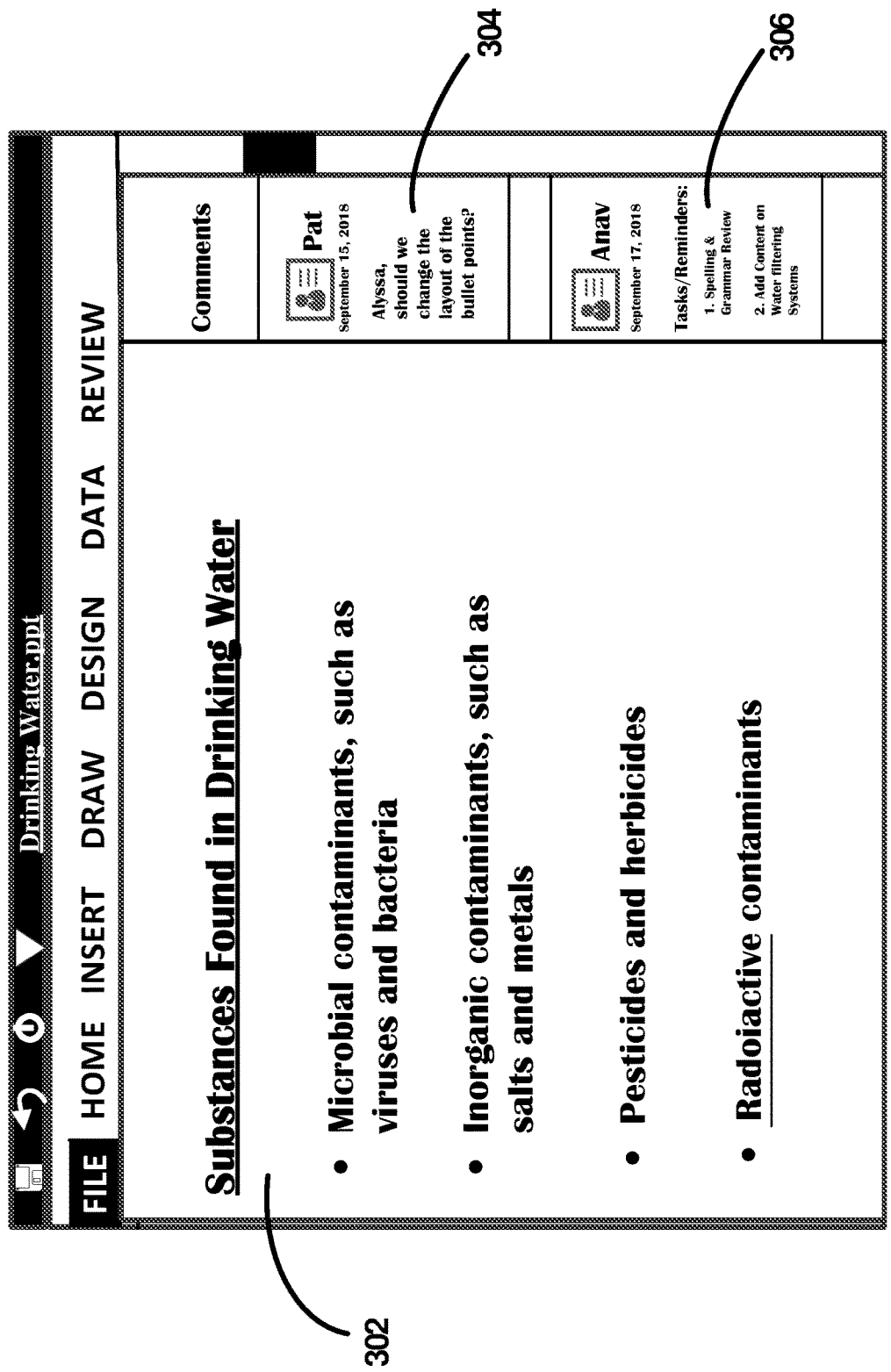
FIGS. 3A-3C illustrate exemplary processing device views associated with provision of contextually relevant suggestions of productivity features through a user interface, with which aspects of the present disclosure may be practiced.
Figure 3B:
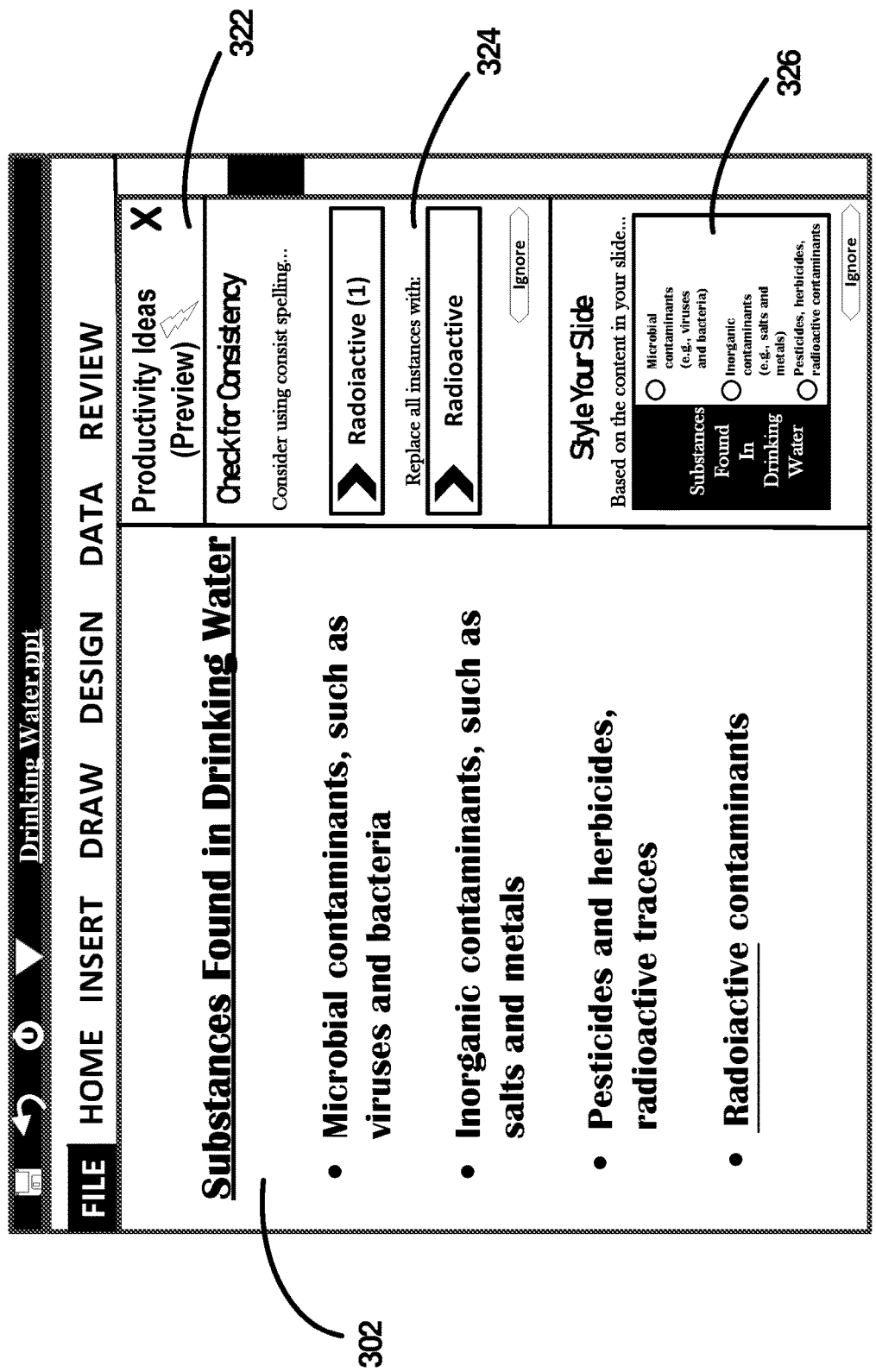
Figure 3C:
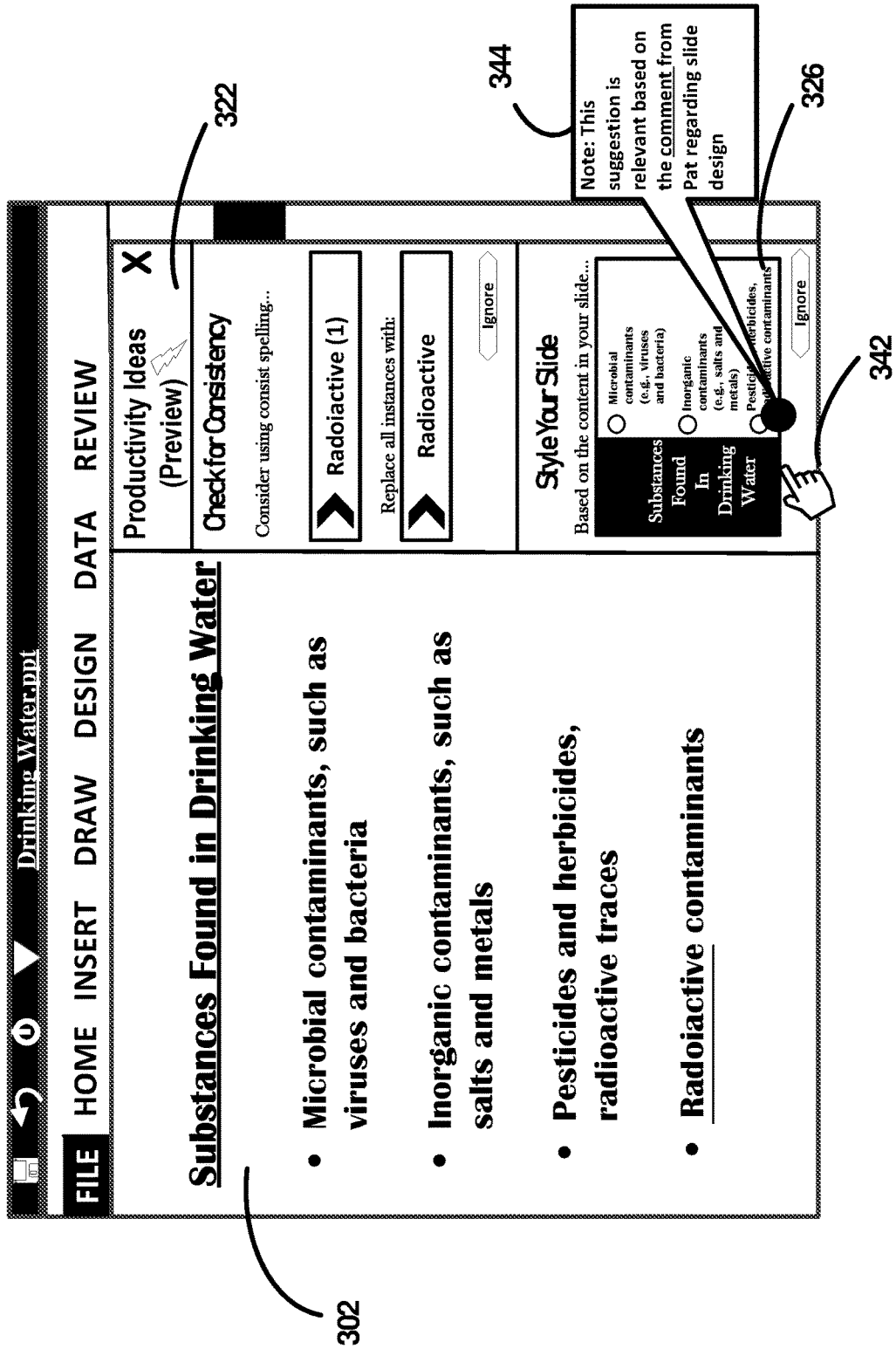

FIGS. 3A-3C illustrate exemplary processing device views associated with provision of contextually relevant suggestions of productivity features through a user interface, with which aspects of the present disclosure may be practiced. Processing operations described in process flow 100 (FIG. 1) and method 200 (FIG. 2) support and supplement back-end processing used for generation of exemplary processing device views shown in FIGS. 3A-3C.

FIG. 3A presents processing device view 300, illustrating an interaction with a user, through a user computing device, and an exemplary productivity service. Processing device view 300 illustrates display of an electronic document 302 through a productivity application/service (e.g., slide-based presentation program). In the example shown in processing device view 300, the user is editing a slide in a presentation discussing drinking water. Processing device view 300 further identifies collaborative comments from users that are jointly editing the electronic document (e.g., a shared electronic document). A first collaborative comment 304 raises a question regarding changing the formatting/layout of the slide shown for the electronic document 302. A second collaborative comment 306 identifies tasks and reminders that are required for update of the electronic document 302. In the example shown, the collaborative comments may provide a basis for generation of productivity feature suggestions, where signal data associated with the collaborative comments may be analyzed to determine a current context at the time that the user is accessing the electronic document 302.

FIG. 3B presents processing device view 320, illustrating another example of an interaction with a user, through a user computing device, and an exemplary productivity service. In one instance, processing device 320 is a continued example, from processing device view 300 (FIG. 3A), where a user interface pane for presentation of productivity features 322 is presented through the user interface of the productivity application/service. The user interface pane for presentation of productivity features 322 illustrates an adapted and improved user interface that is configured for management of productivity feature suggestions. In the example shown, the user interface pane for presentation of productivity features 322 comprises two relevant productivity features suggestions that result from contextual evaluation of signal of user access to the electronic document 302. A first productivity feature suggestion 324 presents spelling/grammar suggestions for a misspelled word ("Radoiactive"), which correlates to the second collaborative comment 306 (FIG. 3A). As an example, an evaluation of the signal data may have analyzed the second collaborative comment 306 and identified a concrete task for completion as requested by a user "Anav" as well as an actual misspelled word that requires fixing. These factors may have contributed to a suggestion for the second collaborative comment 306 being prioritized over a suggestion for the first collaborative comment 304, where the second collaborative comment 306 is displayed first in the user interface pane for presentation of productivity features 322. A second productivity feature suggestion 326 presents formatting and layout modifications for the displayed slide of the electronic document 302. Referring back to the first collaborative comment 304 (FIG. 3A) is a suggestion from a user "Pat" that is posed as a question to another user named "Alyssa". Based on the format of the first collaborative comment 304, contextual analysis may have identified a lower level of confidence, indicating a lessened likelihood that the user is definitely going to utilize a recommended productivity feature that may assist with resolving the user suggestion.

FIG. 3C presents processing device view 340, illustrating another example of an interaction with a user, through a user computing device, and an exemplary productivity service. In one instance, processing device 340 is a continued example, from processing device view 300 (FIG. 3A) and processing device view 320 (FIG. 3B), where a user interface callout 344 is presented that provides the user with insight into why the second productivity feature suggestion 326 was recommended. In the example shown, a user may have scrolled over the preview of the second productivity feature suggestion 326 or alternatively selected the preview, which revealed user interface callout 344. Processing device view 340 is a non-limiting example further identifying how a user interface is adapted and improved when providing relevant productivity feature suggestions. This type of insight may further improve user experience including providing the user with a better understanding as to how applications/services are working to benefit a user.

FIG. 4 illustrates a computing system 401 suitable for implementing processing operations described herein related to contextual relevance processing, with which aspects of the present disclosure may be practiced. Computing system 401, which is representative of any system or collection of systems in which the various applications, services, scenarios, and processes disclosed herein may be implemented. Examples of computing system 401 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, portable electronic devices, smart televisions, smart watches and other wearable devices, as well as any variation or combination thereof.

Computing system 401 may be implemented as a single apparatus, system, or device or may be implemented in a distributed manner as multiple apparatuses, systems, or devices. For example, computing system 401 may comprise one or more computing devices that execute processing for applications and/or services over a distributed network to enable execution of processing operations described herein over one or more services. Computing system 401 may comprise a collection of devices executing processing for front-end applications/services, back-end applications/service or a combination thereof. Computing system 401 comprises, but is not limited to, processing system 402, storage system 403, software 405, communication interface system 407, and user interface system 409. Processing system 402 is operatively coupled with storage system 403, communication interface system 407, and user interface system 409. Processing system 402 loads and executes software 405 from storage system 403. Software 405 includes one or more software components 406 that are configured as relevance suggestion component(s) executing processing operations as described herein including identification and presentation of contextually relevant productivity features for user access to an electronic document. In some examples, computing system 401 may be a device that a user utilizes to access an application/service in which contextually relevant suggestions are surfaced. When executed by processing system 402, software 405 directs processing system 402 to operate as described herein for at least the various processes, operational scenarios, and sequences discussed in the foregoing implementations. Computing system 401 may optionally include additional devices, features, or functionality not discussed for purposes of brevity.

Referring still to FIG. 4, processing system 402 may comprise processor, a micro-processor and other circuitry that retrieves and executes software 405 from storage system 403. Processing system 402 may be implemented within a single processing device but may also be distributed across multiple processing devices or sub-systems that cooperate in executing program instructions. Examples of processing system 402 include general purpose central processing units, graphical processing units, application specific processors, and logic devices, as well as any other type of processing device, combinations, or variations thereof.

Storage system 403 may comprise any computer readable storage media readable by processing system 402 and capable of storing software 405. Storage system 403 may include volatile and nonvolatile, removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions for implementing relevance suggestion components 406 and/or other applications/services of an application platform, as described in the foregoing description.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtual machine software, or other application software. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized to process data and respond to queries. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Communication interface system 407 may also be utilized to cover interfacing between processing components described herein. Examples of connections and devices that together allow for inter-system communication may include network interface cards or devices, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 409 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 409. In some cases, the input and output devices may be combined in a single device, such as a display capable of displaying images and receiving touch gestures. The aforementioned user input and output devices are well known in the art and need not be discussed at length here.

User interface system 409 may also include associated user interface software executable by processing system 402 in support of the various user input and output devices discussed above. Separately or in conjunction with each other and other hardware and software elements, the user interface software and user interface devices may support a graphical user interface, a natural user interface, or any other type of user interface, for example, that enables front-end processing of exemplary application/services described herein (including productivity applications/services).

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
   detecting user access by a first user account to an electronic document that is collaboratively accessible by a group of users;
   applying a trained machine learning model that generates productivity feature notifications for the first user account from a contextual analysis of signal data, wherein the applying of the trained machine learning model executes processing operations that comprise:
      determining a context, associated with the user access to the electronic document, that collectively comprises a plurality of contextual determinations derived based on the contextual analysis of signal data, wherein the plurality of contextual determinations comprise:
         a classification of a type of the user access to the electronic document by the first user account,
         an identification of a collaborative comment, directed to the first user account from one or more other user accounts of the group of users, regarding content of the electronic document, and
         a determination of a reference point in a lifecycle of the electronic document that identifies a state of document creation of the electronic document based on an evaluation of timestamp data for creation of the electronic document and user actions of the group of users with respect to modification of the electronic document, and
      ranking relevance of productivity features, that each provide task completion assistance through a service that presents the electronic document, based on an evaluation of the context determined in the determining of the context; and
   presenting, through a user interface, a notification of one or more of the productivity features that provide a suggestion for resolving the collaborative comment based on a result of evaluating the ranking of the relevance.

2. The method of claim 1, wherein the signal data, used to determine the context, further comprises signal data identifying a level of user engagement with one or more productivity features based on past actions taken by the first user account.

3. The method of claim 1, wherein the collaborative comments, from one or more other user accounts of the group of users, comprise one or more of tasks or reminders posted for the first user account by one or more other users of the group of users, and wherein the one or more tasks or reminders are associated with content of the electronic document.

4. The method of claim 1, further comprising: selecting, based on determinations of the context and the reference point, one or more of the productivity features for user assistance.

5. The method of claim 1, further comprising: receiving, through the user interface, a request for provision of productivity features associated with a productivity application or service; and wherein the presenting presents, based on the request received, the notification of the one or more of the productivity features in a user assistance pane of the user interface.

6. The method of claim 1, wherein the notification of the one or more of the productivity features comprises a selectable graphical user interface element that, upon selection, is configured to apply an automatic action to resolve the collaborative comment.

7. The method of claim 1, wherein the ranking of relevance of the productivity features comprises generating, by the trained machine learning model for each of the plurality of productivity features, a relevance scoring metric that indicates a relevance of a specific productivity feature to the context, and wherein the result of evaluating the ranking of the relevance is a comparative evaluation of respective relevance scoring metrics.

8. The method of claim 7, wherein the applying of the trained machine learning model further executes processing operations that comprise generating a timing prediction as to a level of urgency for interrupting the first user account based on evaluation of the context, and wherein the notification of the one or more productivity features is generated based on a result of collectively analyzing of relevance scoring metrics and the timing prediction as to the level of urgency for interrupting the first user account.

9. A system comprising:
    at least one processor; and
    a memory, operatively connected with the at least one processor, storing computer-executable instructions that, when executed by the at least one processor, causes the at least one processor to execute a method that comprises:
        detecting user access by a first user account to an electronic document that is collaboratively accessible by a group of users;
        applying a trained machine learning model that generates productivity feature notifications for the first user account from a contextual analysis of signal data, wherein the applying of the trained machine learning model executes processing operations that comprise:
            determining a context, associated with the user access to the electronic document, that collectively comprises a plurality of contextual determinations derived based on the contextual analysis of signal data, wherein the plurality of contextual determinations comprise:
                a classification of a type of the user access to the electronic document by the first user account,
                an identification of a collaborative comment, directed to the first user account from one or more other user accounts of the group of users, regarding content of the electronic document, and
                a determination of a reference point in a lifecycle of the electronic document that identifies a state of document creation of the electronic document based on an evaluation of timestamp data for creation of the electronic document and user actions of the group of users with respect to modification of the electronic document, and
            ranking relevance of productivity features, that each provide task completion assistance through a service that presents the electronic document, based on an evaluation of the context determined in the determining of the context; and
        presenting, through a user interface, a notification of one or more of the productivity features that provide a suggestion for resolving the collaborative comment based on a result of evaluating the ranking of the relevance.

10. The system of claim 9, wherein the signal data, used to determine the context, further comprises signal data identifying a level of user engagement with one or more productivity features based on past actions taken by the first user account.

11. The system of claim 9, wherein the collaborative comments, from one or more other user accounts of the group of users, comprise one or more of tasks or reminders posted for the first user account by one or more other users of the group of users, and wherein the one or more tasks or reminders are associated with content of the electronic document.

12. The system of claim 9, wherein the method, executed by the at least one processor, further comprises: selecting, based on determinations of the context and the reference point, one or more of the productivity features for user assistance.

13. The system of claim 9, wherein the notification of the one or more of the productivity features comprises a selectable graphical user interface element that, upon selection, is configured to apply an automatic action to resolve the collaborative comment.

14. The system of claim 9, wherein the ranking of relevance of the productivity features comprises generating, by the trained machine learning model for each of the plurality of productivity features, a relevance scoring metric that indicates a relevance of a specific productivity feature to the determined context, and wherein the result of evaluating the ranking of the relevance is a comparative evaluation of respective relevance scoring metrics.

15. The system of claim 14, wherein the applying of the trained machine learning model further executes processing operations that comprise generating a timing prediction as to a level of urgency for interrupting the first user account based on evaluation of the context, and wherein the notification of the one or more productivity features is generated based on a result of collectively analyzing of relevance scoring metrics and the timing prediction as to the level of urgency for interrupting the first user account.

16. A computer-readable storage media storing computer-executable instructions that, when executed by at least one processor, causes the at least one processor to execute a method comprising:
    detecting user access by a first user account to an electronic document that is collaboratively accessible by a group of users;
    applying a trained machine learning model that generates productivity feature notifications for the first user account from a contextual analysis of signal data, wherein the applying of the trained machine learning model executes processing operations that comprise:
        determining a context, associated with the user access to the electronic document, that collectively comprises a plurality of contextual determinations derived based on the contextual analysis of signal data, wherein the plurality of contextual determinations comprise:
            a classification of a type of the user access to the electronic document by the first user account,
            an identification of a collaborative comment, directed to the first user account from one or more other user accounts of the group of users, regarding content of the electronic document, and
            a determination of a reference point in a lifecycle of the electronic document that identifies a state of document creation of the electronic document based on an evaluation of timestamp data for creation of the electronic document and user actions of the group of users with respect to modification of the electronic document,
        ranking relevance of productivity features, that each provide task completion assistance through a service that presents the electronic document, based on an evaluation of the context determined in the determining of the context, and
        generating a notification of one or more of the productivity features that provide a suggestion for resolving the collaborative comment based on a result of evaluating the ranking of the relevance; and transmitting, to an application or service, data for rendering the notification of one or more of the productivity features.

17. The computer-readable storage media of claim 16, wherein the collaborative comments, from one or more other user accounts of the group of users, comprise one or more of tasks or reminders posted for the first user account by one or more other users of the group of users, and wherein the one or more tasks or reminders are associated with content of the electronic document.

18. The computer-readable storage media of claim 16, wherein the generating of the notification of the one or more of the productivity features comprises including data for rendering a selectable graphical user interface element that, upon selection, is configured to apply an automatic action to resolve the collaborative comment.

19. The computer-readable storage media of claim 16, wherein the ranking of relevance of the productivity features comprises generating, by the trained machine learning model for each of the plurality of productivity features, a relevance scoring metric that indicates a relevance of a specific productivity feature to the context, and wherein the result of evaluating the ranking of the relevance is a comparative evaluation of respective relevance scoring metrics.

20. The computer-readable storage media of claim 19, wherein the applying of the trained machine learning model further executes processing operations that comprise generating a timing prediction as to a level of urgency for interrupting the first user account based on evaluation of the context, and wherein the notification of the one or more productivity features is generated based on a result of collectively analyzing of relevance scoring metrics and the timing prediction as to the level of urgency for interrupting the first user account.

* * * * *